US007614006B2

(12) United States Patent
Molander

(10) Patent No.: US 7,614,006 B2
(45) Date of Patent: Nov. 3, 2009

(54) METHODS AND APPARATUS FOR IMPLEMENTING INLINE CONTROLS FOR TRANSPOSING ROWS AND COLUMNS OF COMPUTER-BASED TABLES

(75) Inventor: Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 11/055,906

(22) Filed: Feb. 11, 2005

(65) Prior Publication Data

US 2006/0184889 A1 Aug. 17, 2006

(51) Int. Cl.
G06F 3/048 (2006.01)
G06F 17/00 (2006.01)
G06F 7/00 (2006.01)

(52) U.S. Cl. .................. 715/764; 715/769; 715/788; 715/227; 707/7; 707/101

(58) Field of Classification Search .................. 715/503, 715/509, 764, 769, 227, 840, 788; 707/7, 707/101, 104.1
See application file for complete search history.

(56) References Cited

U.S. PATENT DOCUMENTS

| | | | | |
|---|---|---|---|---|
| 5,043,916 A | * | 8/1991 | Kawai | 715/509 |
| 5,842,180 A | * | 11/1998 | Khanna et al. | 705/30 |
| 6,298,342 B1 | * | 10/2001 | Graefe et al. | 707/4 |
| 2003/0065662 A1 | * | 4/2003 | Cosic | 707/9 |
| 2003/0097640 A1 | * | 5/2003 | Abrams et al. | 715/530 |
| 2005/0021543 A1 | * | 1/2005 | Schmitt et al. | 707/100 |
| 2005/0228728 A1 | * | 10/2005 | Stromquist | 705/30 |
| 2006/0129914 A1 | * | 6/2006 | Ellis et al. | 715/504 |

* cited by examiner

*Primary Examiner*—Ting Zhou
(74) *Attorney, Agent, or Firm*—Harrington & Smith, PC

(57) ABSTRACT

The present invention concerns methods and apparatus for implementing the ability to transpose rows and columns of a table displayed in a graphical user interface of a computer system. In embodiments of the invention, at least one in-line table row and column control is incorporated in the table; when selected, the in-line table row and column control causes information originally arrayed in columns to be displayed in rows, and causes information originally arrayed in rows to be displayed in columns. In other embodiments of the present invention, a user can select subsets of rows or columns for display in a transposed table with a filter function that operates in combination with the in-line table row and column control. After a filter selection is made, information contained in rows and columns not selected is filtered out and only information in selected rows and columns will be displayed in the transposed table.

17 Claims, 14 Drawing Sheets

| Select | Blade Slot | Blade Type | HW Alerts | SW Alerts | Thresholds | CPU Utilization (%) |
|---|---|---|---|---|---|---|
| ☐ | Slot 1 | HS20 | ■ 0 | ■ 0 | ■ 0 | 17 |
| ☐ | Slot 2 | HS20 | ■ 0 | ■ 0 | ■ 0 | 56 |
| ☐ | Slot 3 | HS20 | ■ 0 | ■ 0 | ■ 0 | 22 |
| ☐ | Slot 4 | HS20 | ■ 0 | ■ 0 | ■ 0 | 10 |
| ☐ | Slot 5 | HS40 | ■ 0 | ■ 0 | ■ 0 | 1 |
| ☐ | Slot 6 | HS40 | ■ 0 | ■ 0 | ■ 0 | 20 |
| ☐ | Slot 7 | JS20 | ⊗ Error: 1 | ■ 0 | ⚠ Warning: 1 | 99 |
| ☐ | Slot 8 | HS20 | ■ 0 | ■ 0 | ■ 0 | 45 |
| ☐ | Slot 9 | HS20 | ■ 0 | ■ 0 | ■ 0 | 14 |
| ☐ | Slot 10 | JS20 | ⚠ Warning: 2 | ■ 0 | ⊗ Error: 3 Wa.. | 75 |
| ☐ | Slot 11 | JS20 | ■ 0 | ■ 0 | ■ 0 | 22 |
| ☐ | Slot 12 | Laural | ■ 0 | ■ 0 | ■ 0 | 31 |
| ☐ | Slot 13 | Groucho | ■ 0 | ■ 0 | ■ 0 | 13 |
| ☐ | Slot 14 | Harpo | ■ 0 | ⊗ Error: 1 | ⚠ Warning: 7 | 99 |

| Select | Blade Slot | Blade Type | HW Alerts | | SW Alerts | | Thresholds | | CPU Utilization (%) | |
|---|---|---|---|---|---|---|---|---|---|---|
| ☐ | Slot 1 | HS20 | ■ | 0 | ■ | 0 | ■ | 0 | ■ | 17 |
| ☐ | Slot 2 | HS20 | ■ | 0 | ■ | 0 | ■ | 0 | ▮ | 56 |
| ☐ | Slot 3 | HS20 | ■ | 0 | ■ | 0 | ■ | 0 | ■ | 22 |
| ☐ | Slot 4 | HS40 | ■ | 0 | ■ | 0 | ■ | 0 | ▪ | 10 |
| ☐ | Slot 5 | HS40 | ■ | 0 | ■ | 0 | ■ | 0 | ▪ | 1 |
| ☐ | Slot 6 | HS20 | ⊗ | Error: 1 | ■ | 0 | ■ | 0 | ■ | 20 |
| ☐ | Slot 7 | JS20 | ⚠ | Warning: 2 | ■ | 0 | ⚠ | Warning: 1 | ▮ | 99 |
| ☐ | Slot 8 | HS20 | ■ | 0 | ■ | 0 | ■ | 0 | ▮ | 45 |
| ☐ | Slot 9 | HS20 | ■ | 0 | ■ | 0 | ■ | 0 | ▪ | 14 |
| ☐ | Slot 10 | JS20 | ■ | 0 | ■ | 0 | ⊗ | Error: 3, Wa.. | ▮ | 75 |
| ☐ | Slot 11 | JS20 | ■ | 0 | ■ | 0 | ■ | 0 | ■ | 22 |
| ☐ | Slot 12 | Laural | ■ | 0 | ■ | 0 | ■ | 0 | ▮ | 31 |
| ☐ | Slot 13 | Groucho | ■ | 0 | ■ | 0 | ■ | 0 | ▪ | 13 |
| ☐ | Slot 14 | Harpo | ■ | 0 | ⊗ | Error: 1 | ⚠ | Warning: 7 | ▮ | 99 |

FIG. 1
PRIOR ART

| Select | Blade Slot | Blade Type | HW Alerts | | SW Alerts | | Thresholds | | CPU Utilization (%) | |
|---|---|---|---|---|---|---|---|---|---|---|
| ☐ | Slot 1 | HS20 | ■ | 0 | ■ | 0 | ■ | 0 | ▪ | 17 |
| ☐ | Slot 2 | HS20 | ■ | 0 | ■ | 0 | ■ | 0 | ▬ | 56 |
| ☐ | Slot 3 | HS20 | ■ | 0 | ■ | 0 | ■ | 0 | ▪ | 22 |
| ☐ | Slot 4 | HS40 | ■ | 0 | ■ | 0 | ■ | 0 | ▪ | 10 |
| ☐ | Slot 5 | HS40 | ⊗ Error: 1 | | ■ | 0 | ■ | 0 | - | 1 |
| ☐ | Slot 6 | JS20 | ■ | 0 | ■ | 0 | ■ | 0 | ▪ | 20 |
| ☐ | Slot 7 | HS20 | ⚠ Warning: 2 | | ■ | 0 | ⚠ Warning: 1 | | ▬ | 99 |
| ☐ | Slot 8 | HS20 | ■ | 0 | ■ | 0 | ■ | 0 | ▬ | 45 |
| ☐ | Slot 9 | JS20 | ■ | 0 | ■ | 0 | ■ | 0 | ▪ | 14 |
| ☐ | Slot 10 | JS20 | ■ | 0 | ⊗ Error: 1 | | ⊗ Error: 3 Wa.. | | ▬ | 75 |
| ☐ | Slot 11 | Laural | ■ | 0 | ■ | 0 | ■ | 0 | ▪ | 22 |
| ☐ | Slot 12 | Groucho | ■ | 0 | ■ | 0 | ■ | 0 | ▪ | 31 |
| ☐ | Slot 13 | Harpo | ■ | 0 | ■ | 0 | ■ | 0 | ▪ | 13 |
| ☐ | Slot 14 | | ■ | 0 | ■ | 0 | ⚠ Warning: 7 | | ▬ | 99 |

| Select | Blade Slot | Blade Type | HW Alerts | SW Alerts | Thresholds | CPU Utilization (%) |
|---|---|---|---|---|---|---|
| ☐ | Slot 1 | HS20 | ■ o | ■ o | ■ o | ▪ 17 |
| ☐ | Slot 2 | HS20 | ■ o | ■ o | ■ o | ▬ 56 |
| ☐ | Slot 3 | HS20 | ■ o | ■ o | ■ o | ▪ 22 |
| ☐ | Slot 4 | HS20 | ■ o | ■ o | ■ o | ▪ 10 |
| ☐ | Slot 5 | HS40 | ■ o | ■ o | ■ o | ▫ 1 |
| ☐ | Slot 6 | HS40 | ■ o | ■ o | ■ o | ▪ 20 |
| ▪ | Slot 7 | JS20 | ⊗ Error: 1 | ■ o | ⚠ Warning: 1 | ▇ 99 |
| ☐ | Slot 8 | HS20 | ■ o | ■ o | ■ o | ▬ 45 |
| ☐ | Slot 9 | HS20 | ■ o | ■ o | ■ o | ▪ 14 |
| ▪ | Slot 10 | JS20 | ⚠ Warning: 2 | ■ o | ⊗ Error: 3  Wa.. | ▆ 75 |
| ☐ | Slot 11 | JS20 | ■ o | ■ o | ■ o | ▪ 22 |
| ☐ | Slot 12 | Laural | ■ o | ■ o | ■ o | ▪ 31 |
| ☐ | Slot 13 | Groucho | ■ o | ■ o | ■ o | ▪ 13 |
| ▪ | Slot 14 | Harpo | ■ o | ⊗ Error: 1 | ⚠ Warning: 7 | ▇ 99 |

| | Attribute | ■ Blade Slot 7 | ■ Blade Slot 10 | ■ Blade Slot 14 |
|---|---|---|---|---|
| ☐ | Blade Type | JS20 | JS20 | Harpo |
| ☐ | HW Alerts | ⊗ Error: 1 | ⚠ Warning: 2 | ■ 0 |
| ☐ | SW Alerts | ⚠ Warning: 1 | ■ 0 | ⊗ Error: 1 |
| ☐ | Thresholds | ■ 0 | ⊗ Error: 3 Wa... | ⚠ Warning: 7 |
| ☐ | CPU Utilization | ▬▬ 99 | ▬ 75 | ▬▬ 99 |
| ☐ | Operation system | Linux V3.1 | Linux V3.1 | Windows Server 9.5 |
| ☐ | Transaction rate | 1023/sec | 899889/sec | 9993/sec |
| ☐ | Serial number | abcdefg12345 | abcdefg12388 | abcdefg12301 |
| ☐ | Blade manufacturer | IBM | IBM | Intel |
| ☐ | Deployment date | Feb 3, 2005 11:11 AM | Oct 3, 2005 11:11 AM | Feb 3, 2005 11:11 AM |
| ☐ | Running since | Feb 3, 2005 11:11 AM | Nov 4, 2005 11:11 AM | Feb 3, 2005 11:11 AM |
| ☐ | Owner | Dept EoU | Dept Mol | Dept Dir |
| ☐ | SNMP Destination | TEC7 (9.67.25.25) | TEC3 (9.67.99.99) | Director (9.67.25.26) |
| ☐ | Description | runs WebSphere | runs LucaMax DB | runs DB2 |

FIG. 4

| Attribute | Blade Slot 7 | Blade Slot 10 | Blade Slot 14 |
|---|---|---|---|
| Blade Type | JS20 | JS20 | Harpo |
| HW Alerts | ⊗ Error: 1 | ⚠ Warning: 2 | ■ 0 |
| SW Alerts | ⚠ Warning: 1 | ⊗ Error: 3, Wa... | ⚠ Warning: 7 |
| Thresholds | ▬▬▬ 99 | ▬▬ 75 | ▬▬▬ 99 |
| Operation system | Linux V3.1 | Linux V3.1 | Windows Server 9.5 |
| Transaction rate | 1023 /sec | 899889/sec | 9993/sec |
| Serial number | abcdefg12345 | abcdefg12388 | abcdefg12301 |
| Blade manufacturer | IBM | IBM | Intel |
| Deployment date | Feb 3, 2005 11:11 AM | Oct 3, 2005 11:11 AM | Feb 3, 2005 11:11 AM |
| Running since | Feb 3, 2005 11:11 AM | Nov 4, 2005 11:11 AM | Feb 3, 2005 11:11 AM |
| Owner | Dept EoU | Dept MoI | Dept Dir |
| SNMP Destination | TEC7 (9.67.25.25) | TEC7 (9.67.25.26) | Director (9.67.25.26) |
| Description | runs WebSphere | runs LucaMax DB | runs DB2 |

FIG. 11

| Select | Blade Slot | Blade Type | HW Alerts | | SW Alerts | | Thresholds | | CPU Utilization (%) | |
|---|---|---|---|---|---|---|---|---|---|---|
| ☐ | Slot 1 | HS20 | ■ | 0 | ■ | 0 | ■ | 0 | ■ | 17 |
| ☐ | Slot 2 | HS20 | ■ | 0 | ■ | 0 | ■ | 0 | ▬ | 56 |
| ☐ | Slot 3 | HS20 | ■ | 0 | ■ | 0 | ■ | 0 | ■ | 22 |
| ☐ | Slot 4 | HS40 | ■ | 0 | ■ | 0 | ■ | 0 | ■ | 10 |
| ☐ | Slot 5 | HS40 | ■ | 0 | ■ | 0 | ■ | 0 | - | 1 |
| ☐ | Slot 6 | JS20 | ■ | 0 | ■ | 0 | ■ | 0 | ■ | 20 |
| ■ | Slot 7 | HS20 | ⊗ Error: 1 | | ■ | 0 | ⚠ Warning: 1 | | ▬ | 99 |
| ☐ | Slot 8 | HS20 | ⚠ Warning: 2 | | ■ | 0 | ■ | 0 | ■ | 45 |
| ☐ | Slot 9 | JS20 | ■ | 0 | ■ | 0 | ■ | 0 | ■ | 14 |
| ■ | Slot 10 | JS20 | ■ | 0 | ■ | 0 | ⊗ Error: 3. Wa. | | ▬ | 75 |
| ☐ | Slot 11 | Laural | ■ | 0 | ⊗ Error: 1 | | ■ | 0 | ■ | 22 |
| ☐ | Slot 12 | Groucho | ■ | 0 | ■ | 0 | ■ | 0 | ■ | 31 |
| ☐ | Slot 13 | Harpo | ■ | 0 | ■ | 0 | ■ | 0 | ■ | 13 |
| ☐ | Slot 14 | | ■ | 0 | ■ | 0 | ⚠ Warning: 7 | | ▬ | 99 |

FIG. 12

METHODS AND APPARATUS FOR IMPLEMENTING INLINE CONTROLS FOR TRANSPOSING ROWS AND COLUMNS OF COMPUTER-BASED TABLES

TECHNICAL FIELD

The present invention generally concerns interactive computer-based tables for display in graphical user interfaces and more particularly concerns methods and apparatus for implementing interactive computer-based tables in graphical user interfaces where rows and columns of the computer-based tables can be rapidly transposed.

BACKGROUND

Tables are a particularly popular way of presenting information in a high-density and organized format. Tables find wide use both in computer environments and on the web.

Tables prepared by known software packages suffer from a number of limitations that hinder their usefulness as data presentation vehicles. In particular, poorly-prepared tables may have many columns that spread across a web page wider than the screen being used to view the web page. When this occurs in a table having a number of rows only a few of which are of interest to a user, the user is presented with a table format necessitating side-to-side horizontal scrolling, when a top-down orientation is, in fact, optimal. Since known tables have limited ability to transpose rows and columns, this limits the flexibility of tables as a presentation device for users.

Some known web pages do have the ability to create a table to compare, for example, consumer electronic products. In such situations, though, the beginning table presents one set of information, and the table created for comparison purposes contains a new set of information not present in the first table. These table creation systems do not operate under user control in any meaningful sense since the only selection the user can make is what products to compare. The user typically has no choice over the categories used to compare products.

In addition, creation of a new table typically occurs in a new web page with a different graphical and tabular layout, making it difficult for the user to maintain continuity between the first table and the second, new table. Further, such table systems have no way to create a new table from the second table by modification or otherwise; typically the only choice available is to go back to the first table and start from the beginning to spawn a third table.

Accordingly, those skilled in the art desire tables with new and improved functionality, where the new functionality makes the table far easier to use. In particular, those skilled in the art desire in-line table controls that allow users to filter table information and to re-arrange the table format. This means the ability to present information initially organized in column format in row format and to present information initially organized in row format in column format.

In addition, those skilled in the art desire tables with in-line controls that allow users to filter table information as rows and columns are being transposed. This would allow a user, for example, to filter out a number of undesired rows from a table before transposing the remaining, desired rows to a column format. Such ability also would allow a user to filter out undesired columns from a table before transposing the remaining columns to a row format.

Further, those skilled in the art desire tables with maximum continuity between the initial table state and a modified table state. This would cause a minimum amount of disorientation to a user, making the consistent table format even more effective as a data presentation vehicle. Such maximum continuity would mean table transformations would occur ideally in the same page through updating the elements within a table on a page, and not by the surfacing of a new page. If a new page were required, the underlying table graphics would be retained, thereby achieving the goal of minimal user disorientation.

Still further, those skilled in the art also desire new tables that retain intermediate table states and all table information in memory. Tables with this ability would permit a user to review beginning, intermediate and ending table states, and also permit a user to return to a state where all table information is displayed.

SUMMARY OF THE PREFERRED EMBODIMENTS

The foregoing and other problems are overcome, and other advantages are realized, in accordance with the following embodiments of the present invention.

A first alternate embodiment of the present invention comprises a signal-bearing medium tangibly embodying a program of machine-readable instructions executable by a digital processing apparatus of a computer system to perform operations for controlling a table-based graphical user interface system, the operations comprising: displaying an interactive table on a display of the computer system, where the interactive table comprises rows and columns; displaying at least one table row and column control, where the at least one table row and column control, when selected, causes the rows and columns of the interactive table to be transposed by moving information originally displayed in rows to columns, and by moving information originally displayed in columns to rows; receiving a command entered with the at least one table row and column control to transpose the rows and columns of the table; and transposing the rows and columns of the table by displaying information previously arranged in rows in columns, and by displaying information previously arranged in columns in rows.

A second alternate embodiment of the present invention comprises a computer system for displaying a table-based graphical user interface, the computer system comprising: at least one memory to store at least one program of machine-readable instructions, where the at least one program performs operations to display an interactive table when executed; and at least one processor coupled to the at least one memory, where the at least one processor performs at least the following operations when the at least one program is executed: displaying the interactive table on a display of the computer system, where the interactive table comprises rows and columns; displaying at least one table row and column control, where the table row and column control, when selected, causes the rows and columns of the interactive table to be transposed by moving information originally displayed in rows to columns, and by moving information originally displayed in columns to rows; receiving a command entered with the at least one table row and column control to transpose the rows and columns of the interactive table; and transposing the rows and columns of the interactive table by displaying information previously arranged in rows in columns, and by displaying information previously arranged in columns in rows.

A third alternate embodiment of the present invention comprises a user interface control system method comprising: displaying an interactive table on a display of a computer system, where the interactive table comprises rows and columns; displaying at least one table row and column control, where the table row and column control, when selected, causes the rows and columns of the interactive table to be transposed by moving information originally displayed in rows to columns, and by moving information originally displayed in columns to rows; receiving a command entered with the at least one table row and column control to transpose the rows and columns of the interactive table; and transposing the rows and columns of the interactive table by displaying information previously arranged in rows in columns, and by displaying information previously arranged in columns in rows.

A fourth alternate embodiment of the present invention comprises a computer system for displaying a table-based graphical user interface, the computer system comprising: memory means for storing at least one program of machine-readable instructions, where the at least one program performs operations to display an interactive table when executed; and processor means coupled to the memory means, the processor means for executing the at least one program, whereby the following operations are performed when the at least one program is executed: displaying the interactive table on a display of the computer system, where the interactive table comprises rows and columns; displaying a table row and column control means for controlling the rows and columns of the interactive table, whereby selecting the table row and column control means causes the rows and columns of the interactive table to be transposed by moving information originally displayed in rows to columns, and by moving information originally displayed in columns to rows; receiving a command entered with the table row and column control means to transpose the rows and columns of the interactive table; and transposing the rows and columns of the interactive table by displaying information previously arranged in rows in columns, and by displaying information previously arranged in columns in rows.

Thus it is seen that embodiments of the present invention overcome the limitations of the prior art. In particular, in the prior art, there was no known inline controls to rearrange the rows and columns of a table in a seamless and non-jarring manner. Conventional computer-based tables provide only minimal methods and apparatus for reorienting columns and rows of a table. In addition, the methods and apparatus of the prior art typically spawn a new table in a new page with a different table layout and often containing different information, thus providing little continuity between the original table and the new table, as well as other disadvantages (e.g., past context is lost, etc.).

In contrast, methods and apparatus of the present invention provide controls in-line to the interactive computer-based table to control transposition and filtering operations. In particular, methods and apparatus of the present invention provide a user with controls to rearrange the rows and columns of a table by moving information initially arrayed in rows to a column format, and by moving information initially arrayed in columns to a row format.

In addition, methods and apparatus of the present invention advantageously provide filtering controls that operate in cooperation with the transposition controls. For example, prior to initiating a table transposition operation, a user can select a subset of rows and/or columns for transposition with a filter control. Information in rows and columns not selected will be filtered out and, as a result, will not be displayed in the new table state created by the table transposition.

Further, a particular advantage of the present invention is that methods and apparatus operating in accordance with the present invention save to computer memory beginning, intermediate and ending table states created by various transpositions and filtering operations. Thus, all table states are available for review by a user. In fact, while studying the information contained in the tables, the user can cycle back and forth through the various table states.

In conclusion, the foregoing summary of the alternate embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 1 depicts a computer-based table in accordance with the prior art;

FIG. 2 depicts a computer-based table having in-line table controls in accordance with the present invention;

FIG. 3 depicts the operation of a computer-based table having in-line table controls in accordance with the present invention;

FIG. 4 depicts the operation of a computer-based table having in-line table controls in accordance with the present invention;

FIG. 11 depicts the operation of a computer-based table having in-line table controls in accordance with the present invention;

FIG. 12 depicts the operation of a computer-based table having in-line table controls in accordance with the present invention;

DETAILED DESCRIPTION OF THE PREFERRED EMBODIMENTS

Figure 5:
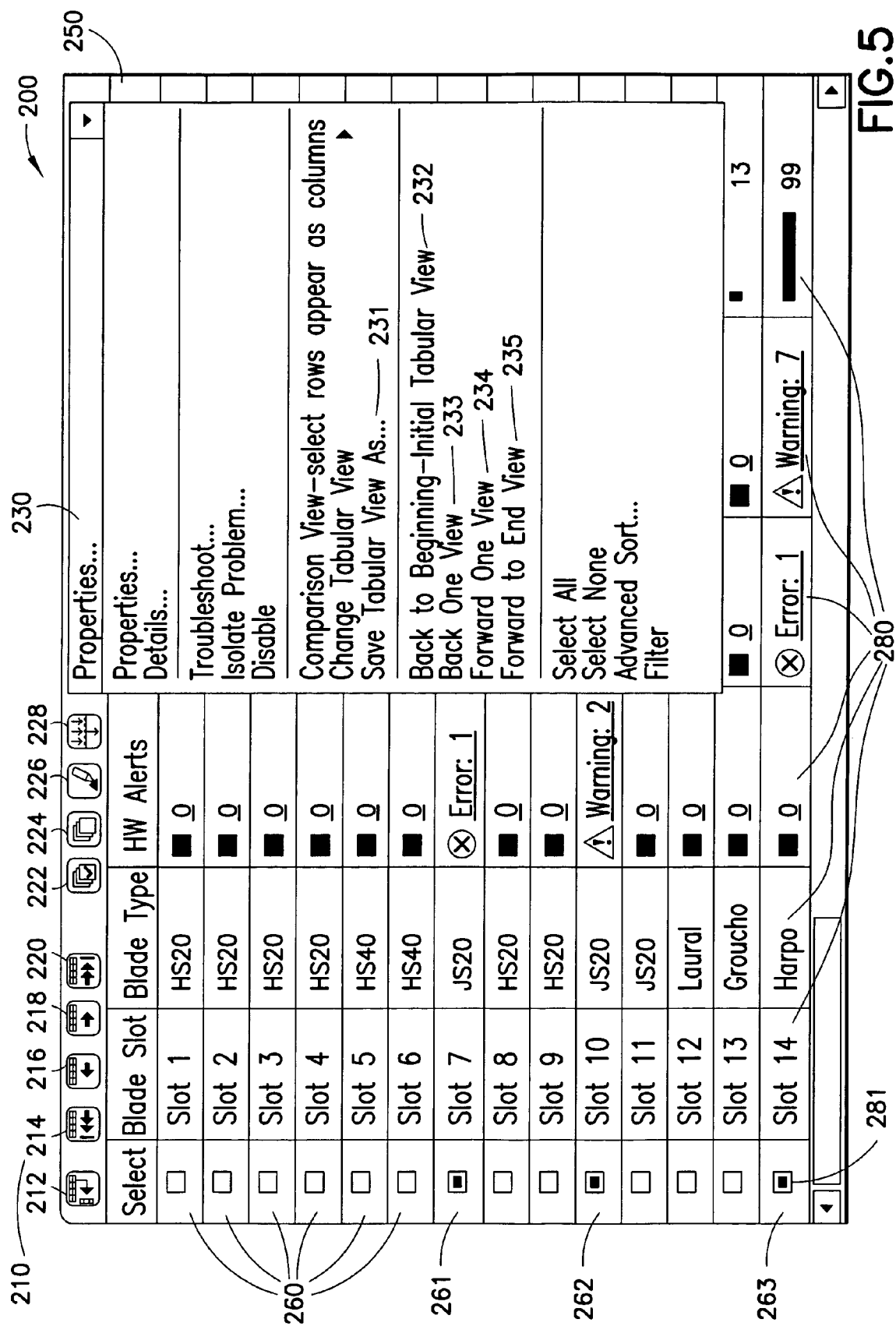
FIG. 5 depicts the operation of a computer-based table having in-line table controls in accordance with the present invention.

A typical computer-based table encountered in the prior art is depicted in FIG. 1. The table 100 consists of a toolbar 110 comprising control icons 112, 114, 116, and 118; a drop-down menu 120; a header row 130 for the columns; rows 140 and columns 150. Control icons 112 and 114 are for selecting all, or de-selecting all, respectively, of the checkboxes in column 151. Control icon 118 performs a filtering function. The drop-down menu 120 generally repeats the commands contained in the toolbar 110.

A particular limitation of the conventional computer-based table depicted in FIG. 1 is that there is no ability to rearrange rows 140 and columns 150. Also not immediately apparent from the table 100 depicted in FIG. 1 is the fact that it extends across many columns; additional columns included in the table are not visible in FIG. 1. The fact that the table extends across many columns makes it even more inconvenient that there is no way to re-arrange the table. Instead of having the option to re-orient the table by displaying information now in rows in columns, and thereby being able to scroll down a single column, the user is forced to slide across the table to see information that is presently displayed in many columns.

This illustrates a particular weakness of the static arrangement of rows and columns encountered in a typical prior art computer-based table. As an example, assume an end user of the table 100 depicted in FIG. 1 is interested in only a portion of the rows 140 shown. In such a situation, it can be said that the table has the wrong orientation; it would be preferable if the information which now extends across many columns for each row entry, extended top-down. In most instances, it is easier to scroll down a table comprised of a few columns and many rows, than to slide a table comprised of a few rows but many columns. In the prior art table 100 depicted in FIG. 1 there is no such capability.

FIG. 2, on the other hand, depicts a computer-based table 200 made in accordance with the present invention that overcomes the limitations of the prior art. The table depicted in FIG. 2 consists of a toolbar 210 comprised of control icons 212, 214, 216, 218, 220, 222, 224, 226 and 228; a drop-down menu 230; a header row 250 for columns; rows 260; and columns 280. Unlike the table 100 depicted in FIG. 1, the table 200 depicted in FIG. 2 has additional table controls 212, 214, 216, 218 and 220 in the toolbar 210. The operation of the table controls will now be described. Control icon 212 corresponds to a table row and column control that allows a user to transpose rows and columns of the table.

In a first step depicted in FIG. 3, the user selects rows 210 corresponding to "slot 7" 261; "slot 10" 262 and "slot 14" 263, using checkboxes contained in column 281. Then the user selects the table row and column control icon 212 to rearrange the table 200. The end result is depicted in FIG. 4. As is apparent from comparison of the initial table state depicted in FIG. 3 and the new table state depicted in FIG. 4, two actions have been performed. First, information contained in rows not selected has been filtered from the presentation and no longer appears in the new table 300 depicted in FIG. 4. Second, the orientation of the table 300 has been changed. Information that once appeared in rows now appears in columns, and information that had appeared in columns, now appears in rows.

Although filtering of information occurs in the example depicted in FIGS. 3-4, filtering need not occur in every instance; in other embodiments of the present invention, table transposition can occur without filtering.

As is apparent from consideration of FIG. 4, the dynamic aspects of a computer-based table made in accordance with the present invention enables a user to reformulate data presentation in a table in a manner that is more suitable for the user. In this particular example, the user was interested in information that was displayed in a relatively few rows. Accordingly, the initial table state 200 depicted in FIG. 3 was inconvenient for the user. If the user desires to make comparisons, the many intervening rows of no interest to the user makes comparison difficult, if not impossible. Also, there is little reason to spread information laterally; it is much easier to consider the relevant information by scrolling down the table.

All of these advantages are apparent in the new table state 300 depicted in FIG. 4. In comparison to the table 200 depicted in FIG. 3, the rows of interest 261, 262 and 263 have now become columns of interest 381, 382 and 383 positioned side-by-side, making comparison very easy. In addition, information that once spread laterally across the table now extends down the table, making for a far more compact presentation of the information.

Another advantage of the present invention is that unique table states created by filtering and table transposition may be saved, as shown in FIG. 5. In FIG. 5, the user has selected the drop down menu 230. As is apparent from the entries contained in the drop-down menu, one option 231 allows a user to save the table state shown in FIG. 5 to a file. This permits a user to recall the particular combination of rows, columns and displayed information at a later time, possibly for incorporation into a presentation being prepared with a presentation software package well-known to those skilled in the art.

Figure 6:
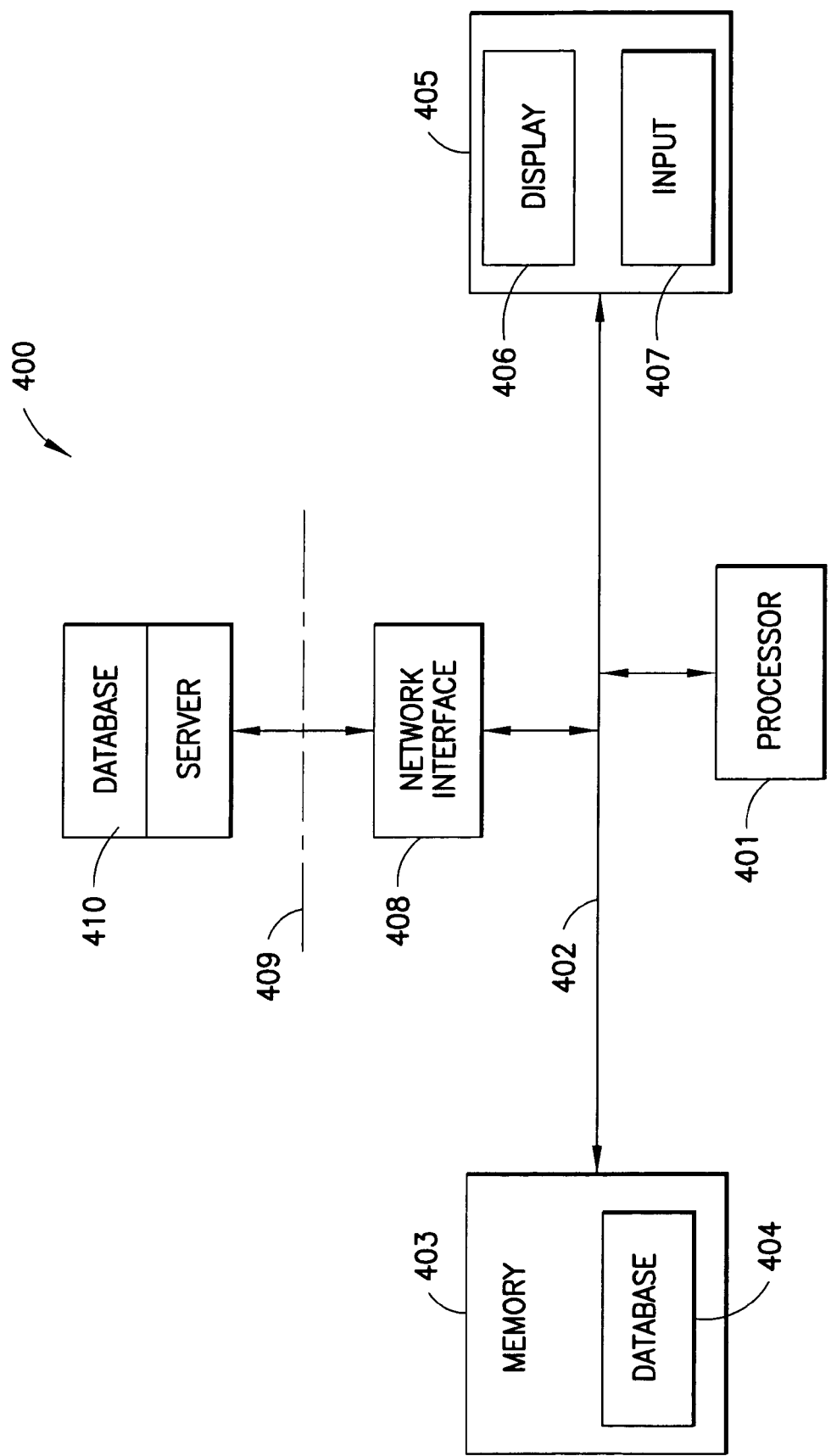
FIG. 6 depicts a block diagram of a computer system suitable for practicing the methods and apparatus of the present invention.

A computer system suitable for practicing the table control methods of the present invention is depicted in simplified form in FIG. 6. The data processing system 400 includes at least one data processor 401 coupled to a bus 402 through which the data processor may address a memory sub-system 403, also referred herein simply as "memory" 403. The memory 403 may include RAM, ROM and fixed and removable disks and/or tape. The memory 403 is assumed to store at least one program comprising instructions for causing the processor 401 to execute methods in accordance with the present invention. Also stored in memory 403 is at least one database 404 containing information that may be managed using the dynamic table controls of the present invention.

The data processor 401 is also coupled through the bus 402 to a user interface 405, preferably comprising both a graphical user interface ("GUI") that includes a user display device 406, such as a high resolution CRT display terminal, a LCD display terminal, or any suitable display device, and a user input device 407, such as one or more of a keyboard, a mouse, a trackball, or a voice recognition interface. With these input/output devices and the methods of the present invention, a user can easily manage dynamic table interfaces.

The data processor 401 may also be coupled through the bus 402 to a network interface 408 that provides bi-directional access to a data communications network 409, such as an intranet and/or the internet. In various embodiments of the present invention, a database 410 of information can be accessed over the internet and the methods of the present invention can be used to more efficiently manage it.

In general, these teachings may be implemented using at least one software program running on a personal computer, a server, a microcomputer, a mainframe computer, a portable computer, an embedded computer, or by any suitable type of programmable data processor 401. Further, a program of machine-readable instructions capable of performing operations in accordance with the present invention may be tangibly embodied in a signal-bearing medium such as a CD-ROM.

Figure 7:
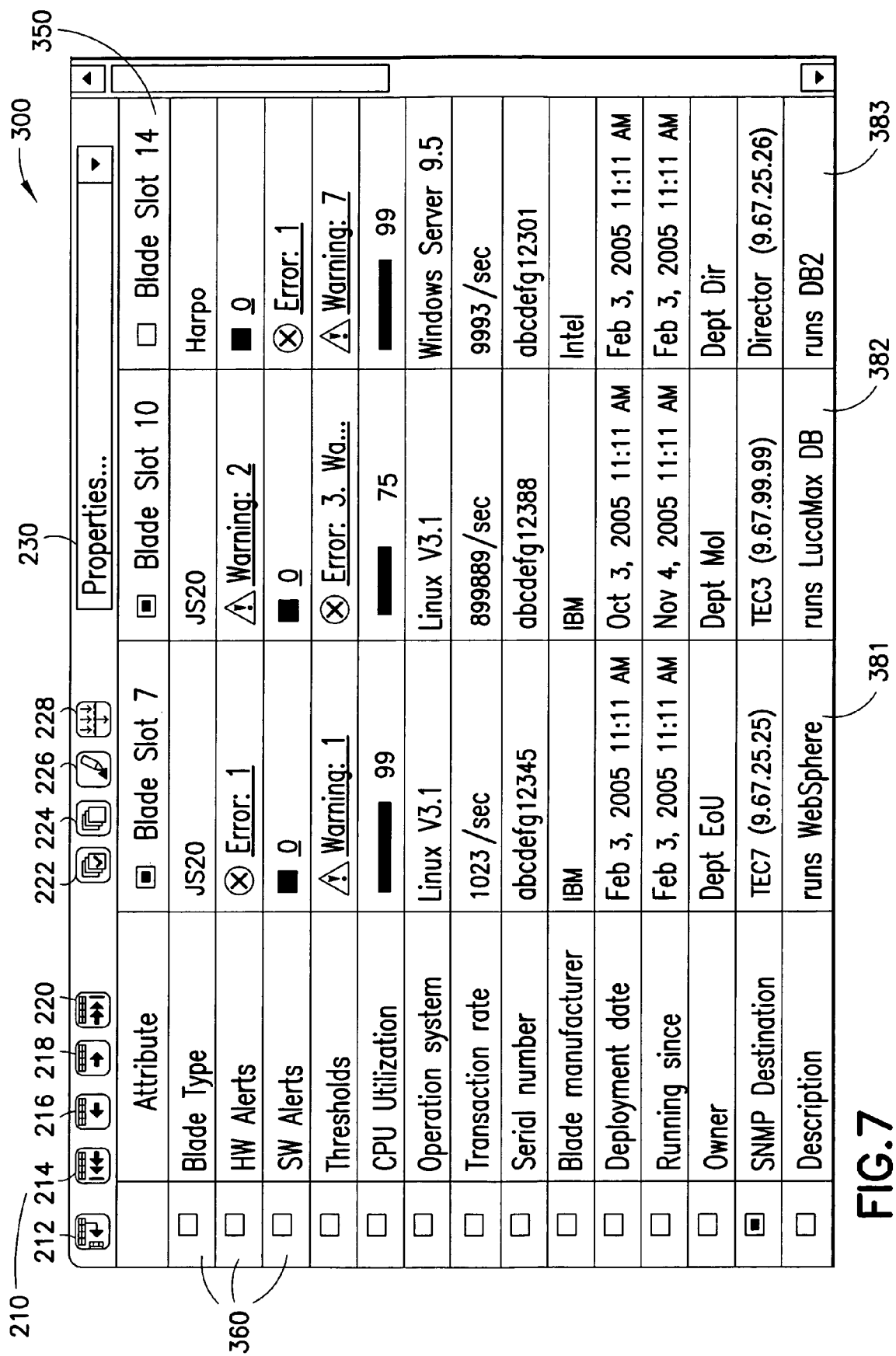
FIG. 7 depicts the operation of a computer-based table having in-line table controls in accordance with the present invention.
Figure 8:
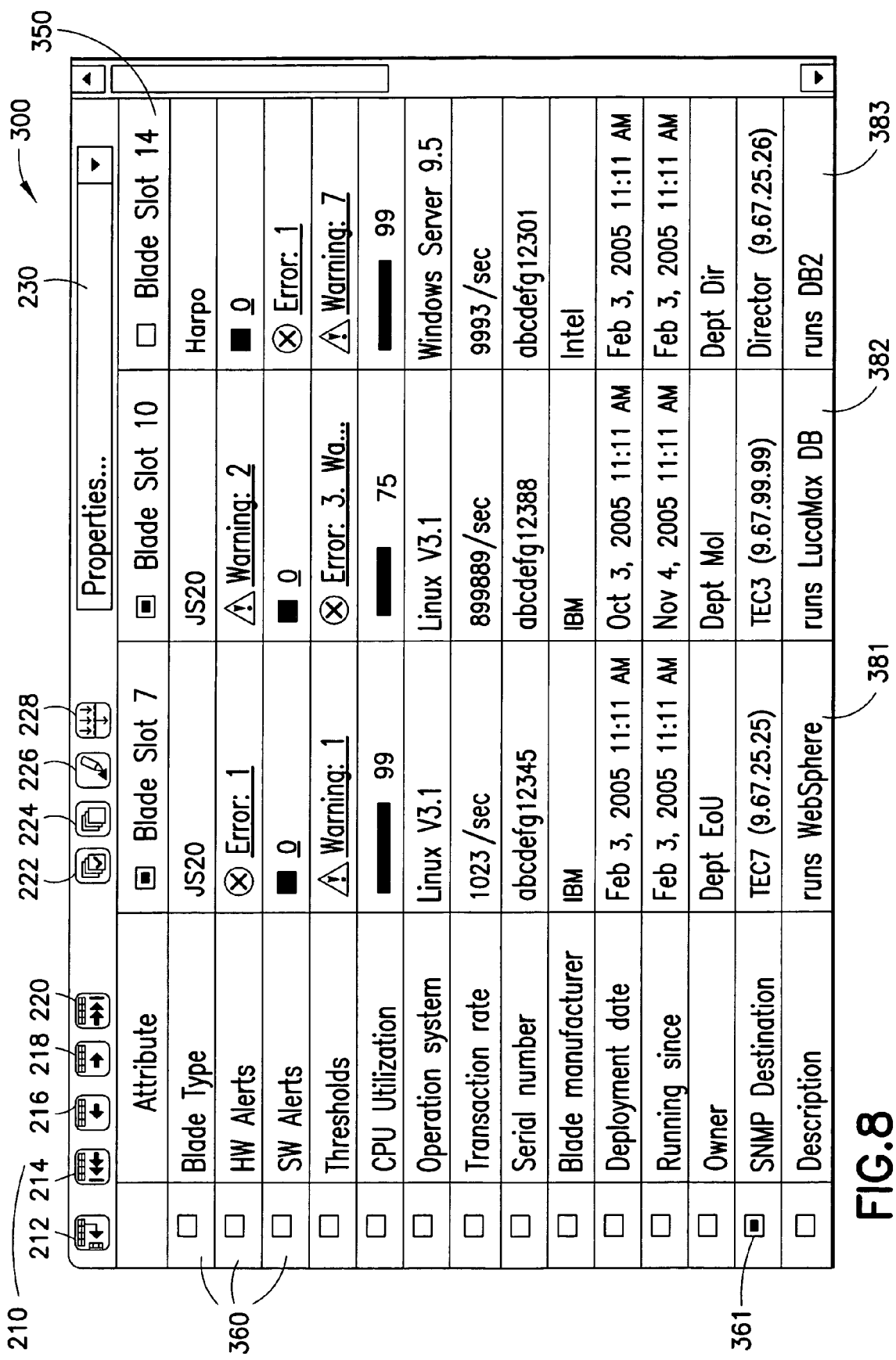
FIG. 8 depicts the operation of a computer-based table having in-line table controls in accordance with the present invention.
Figure 9:
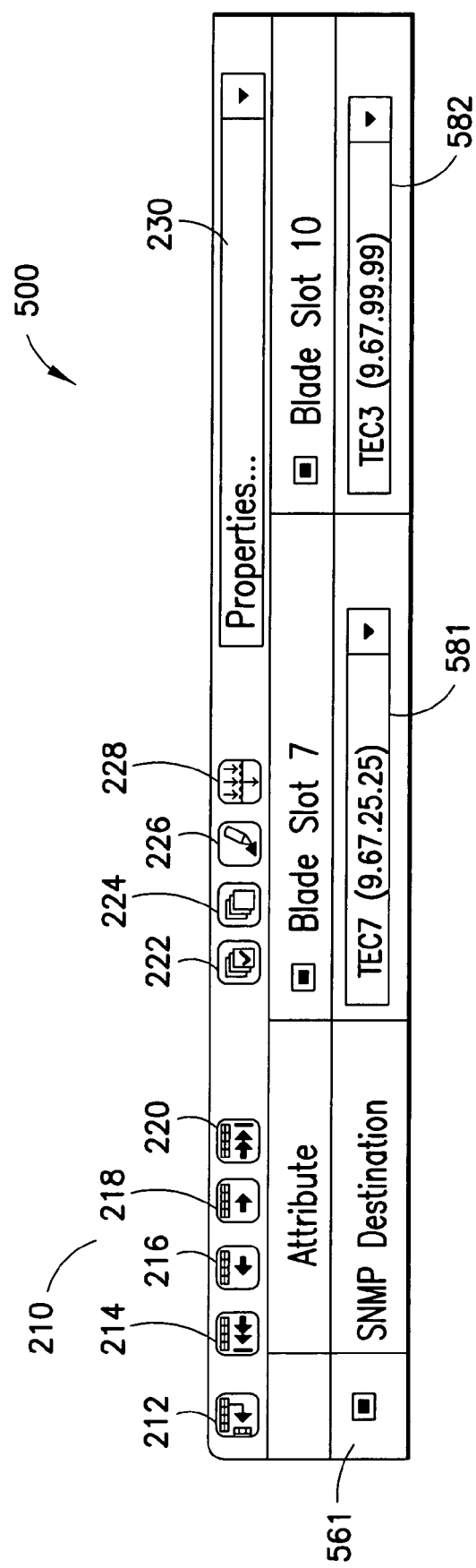
FIG. 9 depicts the operation of a computer-based table having in-line table controls in accordance with the present invention.

This is not the end of the versatility of the dynamic, computer-based table operating in accordance with the present invention. FIGS. 7-9 show additional operations possible with the present invention. After having filtered information from the table presentation, and re-oriented the rows and columns of the table, the user has decided additional filtering is in order. Accordingly, the user de-selects the check box in the column 383 corresponding to "blade slot 14" since the user is no longer interested in the information and desires that it be filtered from the table presentation. In addition, the user has also decided that she is only interested in the information presented in the row 361 entitled "SNMP Destination" and has no interest in information presented in other rows. Accordingly, the user selects the check box in the row 361 corresponding to "SNMP Destination" and leaves the check boxes in the remaining rows un-selected as shown in FIG. 8. Then the user selects the filter button 228, and the table is filtered to another table state 500 as depicted in FIG. 9. Note that in this particular instance no table transposition has occurred. The table is comprised of a single row 561 and two columns 581, 582.

Another aspect of a dynamic table made in accordance with the present invention is that although information may be "filtered", it is never lost. Information is retained in the table by software; it just is not displayed. In various embodiments of the present invention, though, a user may have the ability to change table data. In addition, beginning, intermediate, and end table states are tracked by the software implementing the dynamic table made in accordance with the present invention, so that the user can go back and forth through the table states.

This is accomplished using table control buttons 214, 216, 218 and 220. Table control 214 corresponds to a return-to-beginning-table-state control. Selection of the return-to-beginning-table-state control by a user causes the table to return to the beginning table state before any table filtering or transposition has occurred. Table control 220 corresponds to a forward-to-end-table state control. Selection of the forward-to-end-table-state control by a user causes the table to forward to the final, or end, table state created by the user employing the table filter and transposition controls.

Table control 216 corresponds to a return-to-previous-table-state control. Selection of the return-to-previous-table-state control causes the table to return to a table state immediately previous to a present table state. Table control 218 corresponds to a forward-to-next-table-state control. Selection of the forward-to-next table state control causes the table to forward to a table state immediately after the present table state.

As is apparent in FIG. 5, these controls are also available in the drop-down menu 230 as entries 232, 233, 234 and 235.

Further, the dynamic table made in accordance with the present invention also tracks the primary rows/columns of interest to a user by leaving them selected as the user toggles back and forth through beginning, intermediate, and end table states.

Figure 10:
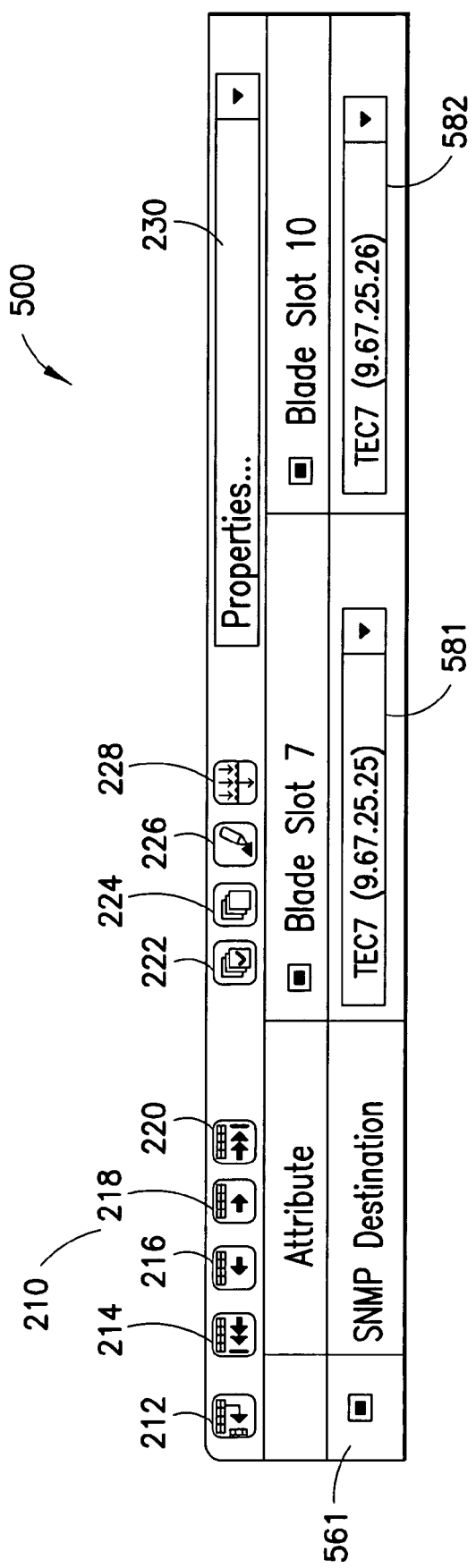
FIG. 10 depicts the operation of a computer-based table having in-line table controls in accordance with the present invention.

The ability to enter data into the table is depicted in FIGS. 9-10, where the user has entered "TEC7" in place of "TEC3" in column 582. This new information will then be treated as any other information in the table, and can be transposed in columns and rows in accordance with the teachings of the present invention.

Another aspect of the present invention is the ability to review beginning, intermediate and ending table states. As shown in FIGS. 11-12, the user is cycling back through previous table states. The ability to cycle through table states makes tables constructed in accordance with the methods and apparatus of the present invention particularly flexible. In an alternate embodiment where table information has changed, the return to a previous table state or forwarding to a next table state may be implemented in various ways. For example, change in table information may be treated as a discrete step separate from table transpositions, or may be reflected in transitions to an earlier table state before the data was entered. If a user returns to a beginning table state with control 214, the state first shown may comprise the original selection of rows and columns but with the new table data entered during table manipulations. An additional selection of the return to beginning table state control 214 would cause the original table information to be displayed. In toggling between intermediate table states with controls 216, 218, changes in table information without table transpositions can be recorded by methods and apparatus operating in accordance with the present invention and retrieved by users.

Figure 13:
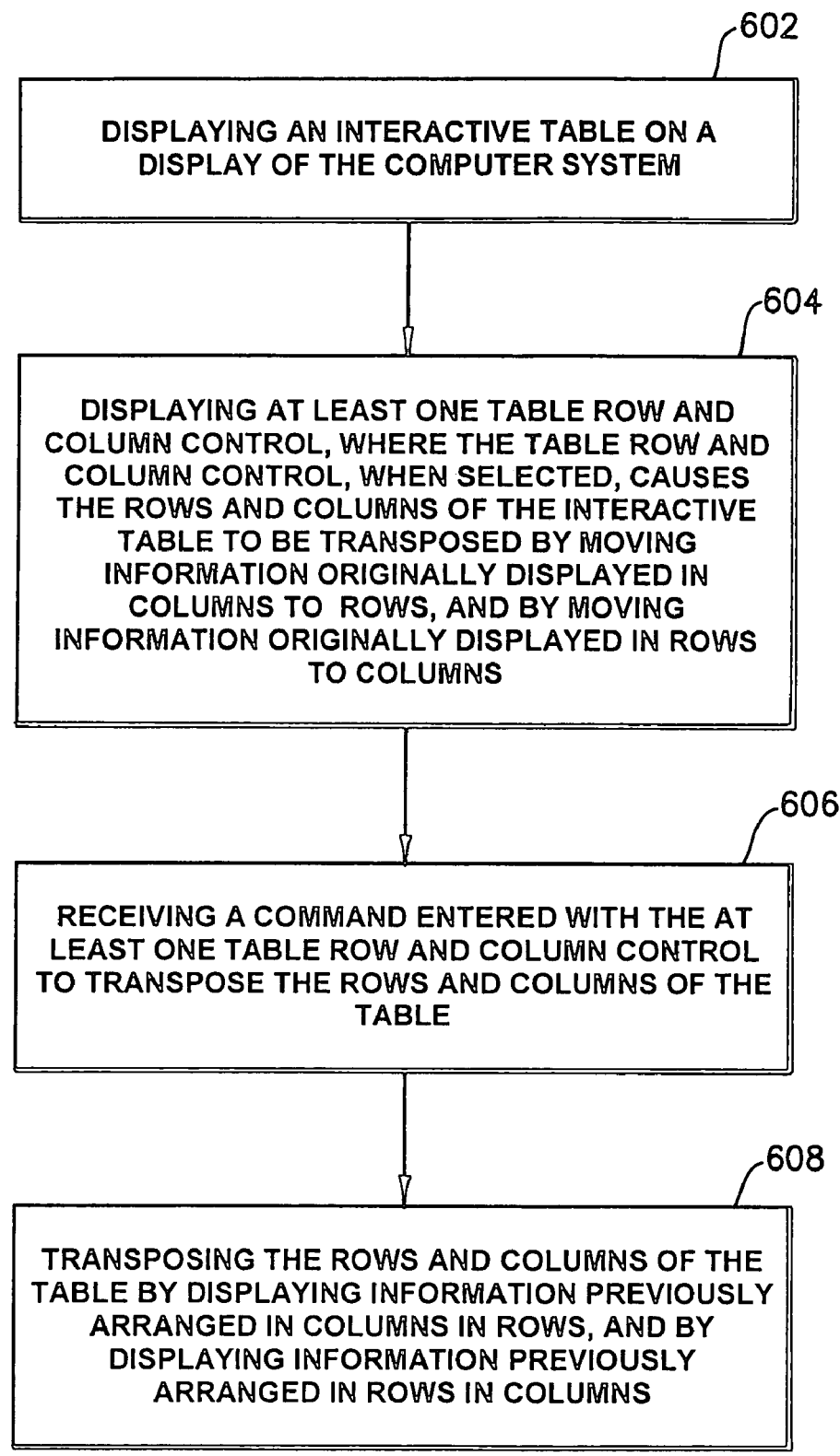
FIG. 13 depicts a flowchart showing the steps of a method operating in accordance with the present invention.

In summary, the operation of a method in accordance with various embodiments of the present invention is depicted in FIG. 13, and is assumed to operate on a computer system like that depicted in FIG. 6. At step 602, an interactive table is displayed on a display 406 of the computer system 400. At step 604, the computer processor 401 displays at least one table row and column control, which, when selected by a user, causes the rows and columns of the interactive table to be transposed by moving information originally displayed in columns to rows, and by moving information originally displayed in rows to columns. At step 606, the computer processor 401 receives a command from a user entered with the at least one table row and column control to transpose the rows and columns of the table. At step 608, the computer processor 401 executes a program capable of performing methods in accordance with the present invention, and transposes the rows and columns of the table by displaying information previously arranged in rows in columns, and by displaying information previously arranged in columns in rows.

In one variant of the method depicted in FIG. 13, the table row and column control further comprises means for filtering the rows and columns. In this variant, the user employs the filter means to select rows and/or columns the information of which will continue to be displayed when the rows and columns are transposed. Information contained in rows not selected will not be displayed when the rows and columns of the table are transposed. This does not necessarily mean the information is discarded; the information can be maintained in memory should the user desire to revisit an earlier table state in which the information was displayed. When the table is displayed in accordance with a previous table state, the information will be displayed. The previous table state can be accessed using the return-to-beginning-table-state control described previously. Likewise intermediate table states can be accessed using control 216, 218 and the end table state can be accessed using control 220.

Figure 14:
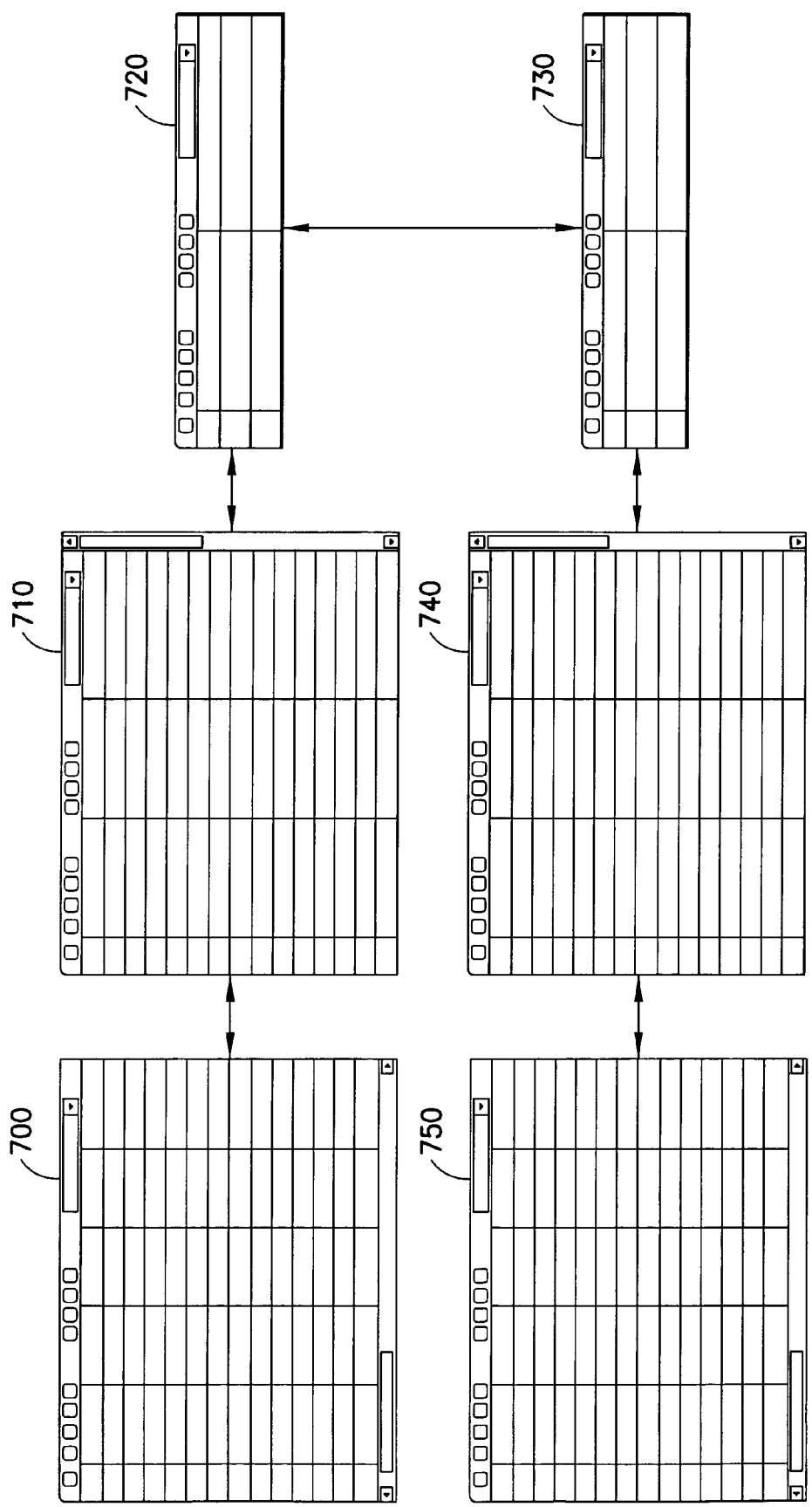
FIG. 14 depicts table states created in accordance with the present invention which may later be recalled by methods and apparatus operating in accordance with the present invention.

In another variant of the method depicted in FIG. 13, the user enters multiple commands serially to create different table states comprised of unique selections and arrangements of table columns, rows and information. The end results after each filter/transposition operation are shown in FIG. 14, as table states 700, 710, 720, 730, 740 and 750. The computer system performs operations to store information describing these table states so that they may later be recalled by the user. When the user desires to review the various table states, the user enters commands with controls 214, 216, 218 and 220 to review the table states. In typical situations, information contained in the table will disappear and then reappear as various table states are reviewed.

Thus it is seen that the foregoing description has provided by way of exemplary and non-limiting examples a full and informative description of the best method and apparatus presently contemplated by the inventor for implementing dynamic table rearrangement capability in interactive table-based graphical displays. One skilled in the art will appreciate that the various embodiments described herein can be practiced individually; in combination with one or more other embodiments described herein; or in combination with interactive tabular interfaces differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

What is claimed is:

1. A memory medium tangibly embodying a program of machine-readable instructions executable by a digital processing apparatus of a computer system to perform operations for controlling a table-based graphical user interface system, the operations comprising:

displaying an interactive table on a display of the computer system, where the interactive table comprises rows and columns;

displaying at least one table row and column control in the interactive table, where the at least one table row and column control, when selected, causes the rows and columns of the interactive table to be transposed by moving information originally displayed in rows to columns, and by moving information originally displayed in columns to rows;

receiving a command entered with the at least one table row and column control to transpose the rows and columns of the table;

transposing the rows and columns of the table by displaying information previously arranged in rows in columns, and by displaying information previously arranged in columns in rows;

receiving a plurality of commands entered with the at least one table row and column control, where each command of the plurality of commands creates a new table state comprising a unique selection and arrangement of rows, columns and table information;

saving each new table state created with the plurality of commands to a memory of the computer system;

receiving at least one command to display at least one of the previously saved table states created by one of the plurality of commands;

recalling the table state from the memory of the computer system; and displaying the table in accordance with the recalled table state.

2. The memory medium of claim 1, where the table row and column control allows a user to select a subset of the rows originally displayed in the table for transposition, and wherein information in the remaining, unselected rows will not be displayed when the selected rows are transposed to column orientation.

3. The memory medium of claim 2, where the table row and column control further comprises a checkbox in each row, and wherein entering a check in a checkbox indicates that the row containing the selected checkbox is to comprise part of the subset of rows for transposition to column orientation.

4. The memory medium of claim 1 where the table row and column control allows a user to select a subset of the column originally displayed in the table for transposition, and wherein information in the remaining, unselected columns will not be displayed when the selected columns are transposed to row orientation.

5. The memory medium of claim 4 where the table row and column control further comprises a checkbox in each column, and wherein entering a check in a checkbox indicates that the column containing the selected checkbox is to comprise part of the subset of columns for transposition to row orientation.

6. The memory medium of claim 1 where the at least one table row and column control further comprises a filter function for filtering at least one of the rows and columns of the table, where filtering of rows and columns removes the filtered rows and columns from display.

7. The memory medium of claim 1 where the operations further comprise: displaying a filter control for filtering at least one of the rows and columns of the table, where filtering of rows and columns removes the filtered rows and columns from display.

8. The memory medium of claim 1 where the at least one table state selected for display corresponds to a beginning table state.

9. The memory medium of claim 1 where the at least one table state selected for display corresponds to an end table state.

10. A computer system for displaying a table-based graphical user interface, the computer system comprising:

at least one memory to store at least one program of machine-readable instructions, where the at least one program performs operations to display an interactive table when executed; and at least one processor coupled to the at least one memory, where the at least one processor causes the computer system to perform at least the following operations when the at least one program is executed:

displaying the interactive table on a display of the computer system, where the interactive table comprises rows and columns;

displaying at least one table row and column control in the interactive table, where the table row and column control, when selected, causes the rows and columns of the interactive table to be transposed by moving information originally displayed in rows to columns, and by moving information originally displayed in columns to rows;

receiving a command entered with the at least one table row and column control to transpose the rows and columns of the interactive table;

transposing the rows and columns of the interactive table by displaying information previously arranged in rows in columns, and by displaying information previously arranged in columns in rows;

receiving a plurality of commands entered with the at least one table row and column control, where each command of the plurality of commands creates a new table state comprising a unique selection and arrangement of rows, columns and table information;

saving each new table state created with the plurality of commands to a memory of the computer system;

receiving at least one command to display at least one of the previously saved table states created by one of the plurality of commands;

recalling the table state from the memory of the computer system; and displaying the interactive table in accordance with the recalled table state.

11. The computer system of claim 10 where the at least one table row and column control further comprises a filter function for filtering at least one of the rows and columns of the interactive table, where filtering of rows and columns removes the filtered rows and columns from display.

12. The computer system of claim 10 where the operations further comprise:

displaying a return to beginning table state control, where selecting the return to beginning table state control returns the interactive table to a beginning state.

13. The computer system of claim 10 where the operations further comprise:

displaying a forward to end table state control, where selecting the forward to end table state control forwards the interactive table to an end state.

14. The computer system of claim 10 where the operations further comprise:
displaying a forward to next table state control, where selecting the forward to next table state control forwards the interactive table to a next table state immediately after a present table state.

15. The computer system of claim 10 where the operations further comprise:
displaying a return to previous table state control, where selecting the return to previous state control returns the interactive table to a table state immediately previous to a present table state.

16. A user interface control system method comprising:
displaying an interactive table on a display of a computer system, where the interactive table comprises rows and columns;
displaying at least one table row and column control in the interactive table, where the table row and column control, when selected, causes the rows and columns of the interactive table to be transposed by moving information originally displayed in rows to columns, and by moving information originally displayed in columns to rows;
receiving a command entered with the at least one table row and column control to transpose the rows and columns of the interactive table;
transposing the rows and columns of the interactive table by displaying information previously arranged in rows in columns, and by displaying information previously arranged in columns in rows;
receiving a plurality of commands entered with the at least one table row and column control, where each command of the plurality of commands creates a new table state comprising a unique selection and arrangement of rows, columns and table information;
saving each new table state created with the plurality of commands to a memory of the computer system;
receiving at least one command to display at least one of the previously saved table states created by one of the plurality of commands;
recalling the table state from the memory of the computer system; and
displaying the interactive table in accordance with recalled table state.

17. A computer system for displaying a table-based graphical user interface, the computer system comprising:
memory means for storing at least one program of machine-readable instructions, where the at least one program performs operations to display an interactive table when executed; and
processor means coupled to the memory means, the processor means for executing the at least one program, wherein the following operations are performed when the at least one program is executed:
displaying the interactive table on a display of the computer system, where the interactive table comprises rows and columns;
displaying a table row and column control means in the interactive table, the table row and control means for controlling the rows and columns of the interactive table, wherein selecting the table row and column control means causes the rows and columns of the interactive table to be transposed by moving information originally displayed in rows to columns, and by moving information originally displayed in columns to rows;
receiving a command entered with the table row and column control means to transpose the rows and columns of the interactive table;
transposing the rows and columns of the interactive table by displaying information previously arranged in rows in columns, and by displaying information previously arranged in columns in rows;
receiving a plurality of commands entered with the at least one table row and column control, where each command of the plurality of commands creates a new table state comprising a unique selection and arrangement of rows, columns and table information;
saving each new table state created with the plurality of commands to a memory of the computer system;
receiving at least one command to display at least one of the previously saved table states created by one of the plurality of commands;
recalling the table state from the memory of the computer system; and
displaying the interactive table in accordance with the recalled table state.

* * * * *

UNITED STATES PATENT AND TRADEMARK OFFICE
CERTIFICATE OF CORRECTION

| | | |
|---|---|---|
| PATENT NO. | : 7,614,006 B2 | Page 1 of 1 |
| APPLICATION NO. | : 11/055906 | |
| DATED | : November 3, 2009 | |
| INVENTOR(S) | : Mark E. Molander | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this

Nineteenth Day of October, 2010

David J. Kappos
*Director of the United States Patent and Trademark Office*